Patented Jan. 13, 1931

1,789,068

UNITED STATES PATENT OFFICE

JULES JOSEPH COLLE AND ACHILLES COLLE, OF SUMMIT, NEW JERSEY

TREATMENT OF BULBS, ROOTS, CORMS, TUBERS, AND THE LIKE

No Drawing.    Application filed January 17, 1930.    Serial No. 421,588.

The present invention relates to a method of treatment of bulbs, roots, corms, tubers and the like, and more particularly to a treatment for arresting or suspending the active growing or maturity period thereof until such time as desired.

According to present practices of horticulturists and nurserymen the blooming period of flowers is more or less uncontrollable and varies largely with the seasons.

All forms of bulbs have a normal blooming period, and heretofore it has been impossible to delay this blooming period without sacrificing the vitality of the bulbs, which in turn entails a material reduction in the number of flowers normally obtainable per bulb, or may result in complete sterility in that, although the bulbs may produce foliage, they will be barren of flowers.

It is therefore an object of the invention to provide a method of treating bulbs, roots, plants and the like, hereinafter referred to generally as "bulbs", so that their normal blooming period may be materially delayed but at the same time controlled with respect to a given date or event.

Another object is to provide a treatment for controlling the blooming period of bulbs which sustains the vitality of the bulbs undergoing treatment, and which does not decrease the normal yield of flowers had the bulbs not received treatment.

A further object is to provide a treatment applicable to numerous varieties of species of bulbs, said treatment being predicated generally upon arrested active growth instead of allowing the bulbs to remain in a more or less extended dormant condition.

A more specific object of the invention is the provision of a treatment designed to prolong or extend the period during which active growth is arrested or suspended, following a period of preliminary active root action.

Other objects of the invention will manifest themselves as the description proceeds.

In describing our treatment we will apply it to a common form of hardy type bulbs, such as the Darwin tulip. The normal blooming period of all varieties of Darwin tulips growing outdoors will vary roughly from March until the latter part of May, depending upon climatic conditions. At the finish of the blooming period these bulbs undergo a dormant or resting period which normally lasts until August. At that time the bulbs, if left in the ground, begin to make new roots, without forming foliage. This active root action is normally suspended by nature under winter conditions and is resumed in the spring under favorable conditions, at which time the bulbs produce both foliage and flowers.

For commercial growing, the practice is to plant the Darwin tulip bulbs in suitable containers, which may be conveniently handled, so that when desired the bulbs may be treated in accordance with approved hothouse practice applicable to bulbs of this type. When treated by this practice the Darwin tulip cannot be brought to flower earlier than about the middle of January. The flowering period will then extend from that time up until about the end of May for those tulip bulbs which are planted outdoors. It will therefore be seen that during the intervening months Darwin tulip flowers are not available.

According to our method of treatment we take the bulbs, plant them in containers, such as mentioned above and permit them to start a preliminary active root action, which is allowed to progress until the bulbs are ready to be transferred to normal hothouse conditions, but instead of doing so, the containers are placed in a treatment room where the temperature is kept at a point low enough to suspend further growth. The period during which growth is arrested may be prolonged indefinitely without harm to the bulb from the standpoint of loss of vitality, and kept beyond the normal blooming of this type of bulb.

The treatment room may comprise adequate storage space in which the temperature may be regulated by a cooling system and in order to prevent harmful, low temperatures, due to outside weather conditions, it may be desirable to install a heating system as well. This would insure close control of the temperature prevailing within the storage rooms, which is an important factor in applying our treatment to bulbs of the semi-hardy or tender type, such as lily bulbs and gladioli. For such types of bulbs the temperature should be slightly above the freezing point (32° F.), whereas for hardy bulbs such as the Darwin tulip type it should be below freezing temperature. As an alternative, where climatic conditions permit the hardy bulbs may be frozen and surrounded by a block of ice, the thawing out of which is prevented by adequate insulation; the semi-hardy or tender types of bulbs may be kept at the proper temperature by the use of stored ice.

When it is desired to bring bulbs subjected to our treatment into flower, the containers may be removed from cold storage, and placed where normal growing conditions prevail. If it happens to be a time or season of the year where outside conditions are not favorable to blooming, the bulbs may then be placed in a hot-house and subjected to conditions favorable to promote flowering. The bulbs when placed under favorable blooming conditions will resume their active growing, without exhibiting loss of vitality or reduction in the normal number of flowers per bulb, which would be the case had not the bulbs been subjected to the present treatment.

What may be regarded as an effort to obtain the results of the present invention is the practice heretofore prevailing of taking certain bulbs when in their dormant condition and subjecting them to a cold storage treatment. This practice is applied to lily bulbs and lily of the valley pips and clumps, the former being unrooted and the latter with the roots in a dormant condition. However, our treatment is distinguished from this method in that the bulbs are not given a preliminary active root action, which is subsequently arrested or suspended by cold storage treatment. Bulbs not having a root system, are not capable of surviving an indefinite period of arrested active growth; they suffer a loss of vitality, strength and vigor to such an extent that in the case of certain variety of lily bulbs, as for example, *Lilium giganteum*, which normally would give five or six flowers, when planted in the normal planting time, will not yield an average of more than three flowers after having been kept in cold storage for seven or eight months. This particular variety of lily bulb is the only one that will survive cold storage for a period extending substantially beyond six months, while other varieties of lily bulbs will not survive cold storage treatment of any material duration. However, these same varieties of lily bulbs when subjected to our treatment may have their blooming period postponed for a much longer time than it is now possible to postpone such period by the application of existing prior treatments.

Our treatment, which includes preliminary active root action followed by arrested or suspended growth, imitates the resting season of the bulbs, etc., in their natural surroundings so perfectly and for such an extended period, that the treated subjects are actually strengthened; they are brought to maturity in a shorter time and give an increased yield when removed from the treatment rooms and given the usual conditions favorable to their development.

It is therefore appreciated that although our treatment has been described specifically as applied to the treatment of Darwin tulips, it is nevertheless applicable to the treatment of practically all forms of bulbs, roots, corms, tubers and the like and it is desired to have the appended claims interpreted as covering a method of treatment applicable to the same.

What is claimed is:

1. The method of controlling the period of maturity for bulbs and the like, comprising starting a preliminary active root action on said bulbs, arresting said action for an indefinite period, and subsequently promoting said action under the usual conditions favorable to maturity of the bulbs.

2. The method of controlling the period of maturity for bulbs and the like, comprising starting an active root action at the normal period of planting the bulbs, arresting said action for an indefinite period, and subsequently promoting said action under usual conditions favorable to maturity of the bulbs.

3. The method of controlling the period of maturity of bulbs and the like, comprising preserving the vitality of the bulbs beyond the normal period of blooming by promoting the growth of a preliminary active root system at the normal period of planting, said root system being capable of surviving an indefinite period of arrested active growth, arresting the growth of said root system, and subsequently promoting said growth under conditions favorable to maturity of the bulbs.

4. The method of preparing bulbs and the like for storage, comprising starting an active root action at the normal period of planting the bulbs, arresting said action during the period of storage so that when said bulbs are subsequently removed from storage and placed under favorable growing conditions, the root system previously developed will be capable of bringing the bulbs to maturity.

5. The method of preparing bulbs and the like so that their maturity can be indefinitely postponed, comprising starting an active root action at the normal period of planting the bulbs, arresting said action by virtue of the character of storage to which the bulb is subjected, and subsequently removing said bulbs from storage and promoting the growth of the root system under usual conditions favorable to the maturity of the bulbs.

In testimony whereof, we have hereunto subscribed our names this 15th day of January, 1930.

JULES JOSEPH COLLE.
ACHILLES COLLE.